United States Patent
Hsiao et al.

(10) Patent No.: US 9,832,211 B2
(45) Date of Patent: Nov. 28, 2017

(54) COMPUTING DEVICE TO DETECT MALWARE

(75) Inventors: Hsu-Chun Hsiao, Pittsburgh, PA (US); Shuo Deng, Cambridge, MA (US); Babak Salamat, Mountain View, CA (US); Rajarshi Gupta, Sunnyvale, CA (US); Saumitra Mohan Das, San Jose, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 175 days.

(21) Appl. No.: 13/424,251

(22) Filed: Mar. 19, 2012

(65) Prior Publication Data

US 2013/0247187 A1    Sep. 19, 2013

(51) Int. Cl.
| | | |
|---|---|---|
| *G06F 21/55* | (2013.01) | |
| *G06F 21/56* | (2013.01) | |
| *H04L 29/06* | (2006.01) | |
| *G06F 21/60* | (2013.01) | |

(52) U.S. Cl.
CPC ........ *H04L 63/1416* (2013.01); *G06F 21/552* (2013.01); *G06F 21/56* (2013.01)

(58) Field of Classification Search
CPC ............. H04L 63/1425; H04L 63/1458; H04L 12/2602; G06F 21/56; G06F 21/00; G06F 21/50; G06F 21/55; G06F 21/554; G06F 21/566; G06F 17/30864; G06F 2009/45587; G06F 2221/2149
USPC .......................................... 726/2, 22, 23, 24
See application file for complete search history.

(56) References Cited

U.S. PATENT DOCUMENTS

| | | | |
|---|---|---|---|
| 7,809,670 B2 | 10/2010 | Lee et al. | |
| 8,201,244 B2 * | 6/2012 | Sun ........................ | G06F 21/564 |
| | | | 713/165 |
| 8,260,769 B1 * | 9/2012 | Fuller .......................... | 707/721 |
| 8,555,388 B1 | 10/2013 | Wang et al. | |
| 2004/0187023 A1 | 9/2004 | Alagna et al. | |
| 2004/0205419 A1 * | 10/2004 | Liang ..................... | G06F 21/552 |
| | | | 714/57 |
| 2006/0242705 A1 * | 10/2006 | Sadhasivam .......... | H04L 63/145 |
| | | | 726/23 |

(Continued)

FOREIGN PATENT DOCUMENTS

| | | |
|---|---|---|
| CN | 200962655 Y | 10/2007 |
| JP | 2010262609 A | 11/2010 |

(Continued)

OTHER PUBLICATIONS

Bose, et al., "Behavioral Detection of Malware on Mobile Handsets," MobiSys '08, Jun. 17-20, 2008, pp. 225-238.

(Continued)

*Primary Examiner* — Tae Kim
*Assistant Examiner* — Shiuh-Huei Ku
(74) *Attorney, Agent, or Firm* — The Marbury Law Group

(57) ABSTRACT

Disclosed is an apparatus and method for a computing device to determine if an application is malware. The computing device may include: a query logger to log the behavior of the application on the computing device to generate a log; a behavior analysis engine to analyze the log from the query logger to generate a behavior vector that characterizes the behavior of the application; and a classifier to classify the behavior vector for the application as benign or malware.

28 Claims, 6 Drawing Sheets

(56) References Cited

U.S. PATENT DOCUMENTS

| | | |
|---|---|---|
| 2007/0074289 A1 | 3/2007 | Maddaloni |
| 2007/0240218 A1 | 10/2007 | Tuvell et al. |
| 2008/0127336 A1 | 5/2008 | Sun et al. |
| 2009/0019546 A1 | 1/2009 | Park et al. |
| 2009/0070283 A1* | 3/2009 | Kang et al. .................... 706/45 |
| 2009/0300765 A1* | 12/2009 | Moskovitch .......... G06F 21/562 726/24 |
| 2010/0162350 A1* | 6/2010 | Jeong et al. ...................... 726/1 |
| 2010/0192222 A1 | 7/2010 | Stokes et al. |
| 2011/0055925 A1 | 3/2011 | Jakobsson |
| 2011/0167474 A1 | 7/2011 | Sinha et al. |
| 2011/0209218 A1* | 8/2011 | McRae ........................ 726/23 |
| 2012/0174227 A1* | 7/2012 | Mashevsky et al. ........... 726/24 |
| 2012/0210423 A1 | 8/2012 | Friedrichs et al. |
| 2013/0014262 A1 | 1/2013 | Lee et al. |
| 2013/0097706 A1 | 4/2013 | Titonis et al. |
| 2014/0123289 A1 | 5/2014 | Hsiao et al. |

FOREIGN PATENT DOCUMENTS

| | | |
|---|---|---|
| JP | 2010267128 A | 11/2010 |
| WO | 2011122845 A2 | 10/2011 |

OTHER PUBLICATIONS

International Search Report and Written Opinion—PCT/US2013/031184—ISA/EPO—Jun. 19, 2013.

\* cited by examiner

COMPUTING DEVICE TO DETECT MALWARE

BACKGROUND

Field

The present invention relates generally to a computing device that is capable of detecting if an application is malware.

Relevant Background

Computing devices are often used to run diverse applications which originate from many sources. Unfortunately, applications with malicious intent (e.g., malware) are often installed onto a user's computing device. Users are typically unaware of this because malicious applications often masquerade as well known applications. Further, these malicious applications utilize more permissions than are necessary for their functions.

Protecting computing devices from security threats, such as malware, is a concern for modern computing devices. Malware includes unwanted applications that attempt to harm a computing device or a user. Different types of malware include trojans, worms, keyloggers, viruses, backdoors and spyware. Malware authors may be motivated by a desire to gather personal information, such as credit card numbers and bank account numbers or cause a cell phone to connect to paid services. Thus, there is a financial incentive motivating malware authors to develop more sophisticated methods for evading detection.

Traditional malware signature detection methods extract signatures from an invariant portion of the actual executable part of a target application. Signature-based malware detection requires a signature (e.g., a unique pattern in the malware's code) for each malware variant. Therefore, it is impossible to detect unknown malware utilizing signature-based malware detection. In addition, even for known malware, there tends to be a delay between the detection of the signature and when it is actually updated on a computing device. Further, malware checking using signatures is often processor and memory intensive. This is especially more difficult for mobile computing devices. Also, because signature checking is expensive on mobile devices, such as cell phones, many detectors simply check the application filenames for well known rogue applications.

Because of these issues, it would be beneficial to utilize behavior analysis for the purpose of characterizing, comparing, and classifying applications on a computing device to determine whether applications are malware—which is less processor and memory intensive and can occur in a much quicker fashion.

SUMMARY

Aspects of the invention may relate to an apparatus and method for a computing device to determine if an application is malware. The computing device may include: a query logger to log the behavior of the application on the computing device to generate a log; a behavior analysis engine to analyze the log from the query logger to generate a behavior vector that characterizes the behavior of the application; and a classifier to classify the behavior vector for the application as benign or malware.

Aspects of the invention may also relate to an apparatus and method for a server to determine if an application is malware for a computing device. The server may include: a processing circuit to receive a plurality of behavior vector sets from a plurality of computing devices in which each behavior vector set may characterize the behavior of an application; and a behavior analysis engine. The behavior analysis engine may update a global classifier based upon the received behavior vector sets as benign or malware.

DETAILED DESCRIPTION

The word "exemplary" or "example" is used herein to mean "serving as an example, instance, or illustration." Any aspect or embodiment described herein as "exemplary" or as an "example" in not necessarily to be construed as preferred or advantageous over other aspects or embodiments.

Figure 1:
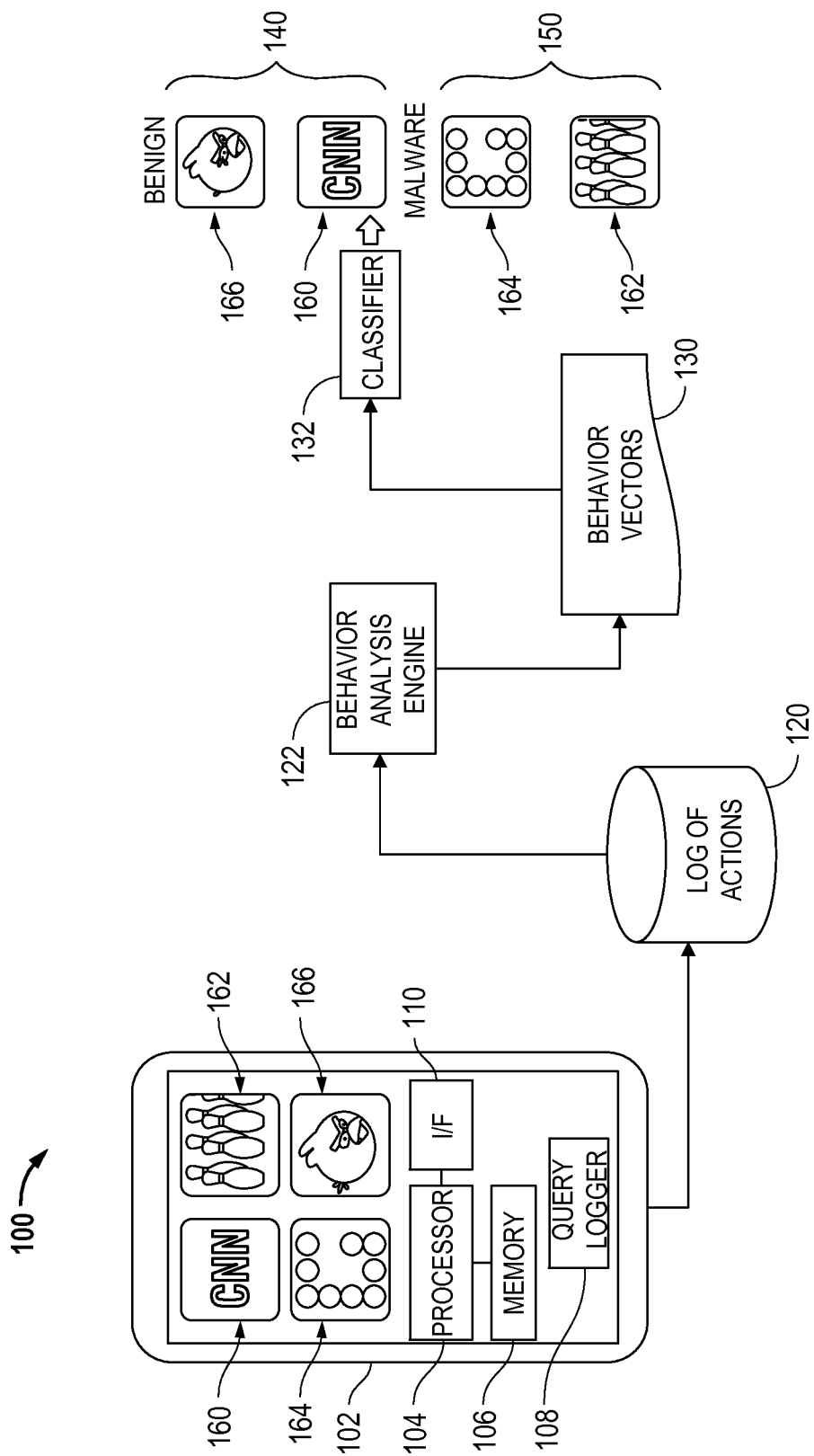
FIG. 1 is a block diagram of a system in which aspects of the invention may be practiced.

With reference to FIG. 1, FIG. 1 is block diagram of system 100 in which aspects of the invention may be practiced. In particular, system 100 illustrates a computing device 102 that may be used to determine if an application is malware. Computing device 102 may comprise a query logger 108, a behavior analysis engine 122, and a classifier 132. In one aspect, query logger 108 may log the behavior of an application on the computing device to generate a log 120. The log 120 may be a log of actions performed or associated with the application. The log of actions 120 therefore shows the behavior of the application. Behavior analysis engine 122 may analyze the log 120 from the query logger to generate behavior vectors 130 that characterize the behavior of the application. Classifier 132 may classify the behavior vectors 130 for the application as benign 140 or as malware 150. If the behavior vector 130 is classified as malware 150, the application associated with the behavior vectors 130 may be deleted or restricted from usage. As will be described, many different behavior vectors 130 may be generated to characterize the behavior of an application and based upon these the classifier 132 may classify the application as benign 140 or malware 150.

Computing device 102 may include a processor 104, a memory 106, and an interface 110. It should be appreciated that computing device 102 may include a display device, a user interface (e.g., keyboard, touch-screen, etc), a power device (e.g., a battery), as well as other components typically associated with a computing device. Computing device 102 may be a mobile device or a non-mobile device. For example, interface 110 may be a wireless transceiver to transmit and receive calls and data through a wireless link to/from a wireless network or may be wired interface for direct connection to networks (e.g., the Internet). Thus, computing device 102 may be a: mobile device, wireless device, cell phone, personal digital assistant, mobile computer, tablet, personal computer, laptop computer, server computer, or any type of computing device.

Computing device 102 may include a processor 104 configured to execute instructions for implementing query logger 108, behavior analysis engine 122, and classifier 132. Memory 106 may be coupled to processor 104 to store instructions for execution by processor 104. In one aspect, computing device 102 may include a processor 104 that is configured to execute instructions to implement: query logger 108 that may log the behavior of an application on the computing device 102 to generate log of actions 120; behavior analysis engine 122 that may analyze the log of actions 120 from the query logger 108 to generate behavior vectors 130 that characterize the behavior of the application; and classifier 132 that may classify the behavior vectors 130 for the application as benign 140 or as malware 150. If the behavior vector 130 is classified as malware 150, the application associated with the behavior vectors 130 may be deleted or restricted from usage by the computing device 102.

It should be appreciated that aspects of the invention as will be hereinafter described may be implemented in conjunction with the execution of instructions by processor 104 of computing device 102 and/or other circuitry of the computing device 102 and/or other devices. Particularly, circuitry of the computing device 102, including but not limited to processor 104, may operate under the control of a program, routine, or the execution of instructions to execute methods or processes in accordance with embodiments of the invention. For example, such a program may be implemented in firmware or software (e.g. stored in memory 106 and/or other locations) and may be implemented by processors, such as processor 104, and/or other circuitry of computing device 102. Further, it should be appreciated that the terms processor, microprocessor, circuitry, controller, etc., refer to any type of logic or circuitry capable of executing logic, commands, instructions, software, firmware, functionality, etc Further, it should be appreciated that some or all of the functions of the query logger 108, behavior analysis engine 122, and classifier 132 may performed by computing device 102 itself and/or some or all of the functions may be performed by another computing device connected via interface 110 (wirelessly or wired) to computing device 102. Thus, some and/or all of the functions may be performed by another computing device and the results transferred back to computing device 102. Also, according to particular aspects, the classifier 132 may be a machine learning classifier and computing device 102 may be a mobile device.

Looking at a particular example, as shown in FIG. 1, four applications may be loaded (with our without a user's consent) to the computing device 102: news application 160 (e.g., CNN), game (e.g., bowling) 162, game (e.g., snake) 164, and game (e.g., bird) 166. Computing device 102 may automatically determine if these applications are benign or malware. In particular, query logger 108 may log the actions or behavior of the applications 160, 162, 164, and 166 on the computing device to generate the log of actions 120. Behavior analysis engine 122 may analyze the log of actions 120 for each of the applications to generate behavior vectors 130 for each of the applications that characterize the behavior of each application 160, 162, 164, and 166. Classifier 132 may classify the behavior vectors 130 for each of the applications 160, 162, 164, and 166 as benign 140 or as malware 150. In this example, news application 160 and game application 166 are classified based on their behavior vectors 130 as benign 140 and are allowed for use by computing device 102. On the other hand, game applications 162 and 164 are classified as malware 150 based on their behavior vectors 130 and are deleted or restricted from usage by computing device 102. Aspects of the query logger, the log of actions, the behavior analysis engine, and the behavior vectors will be described hereinafter in more detail.

Figure 2:
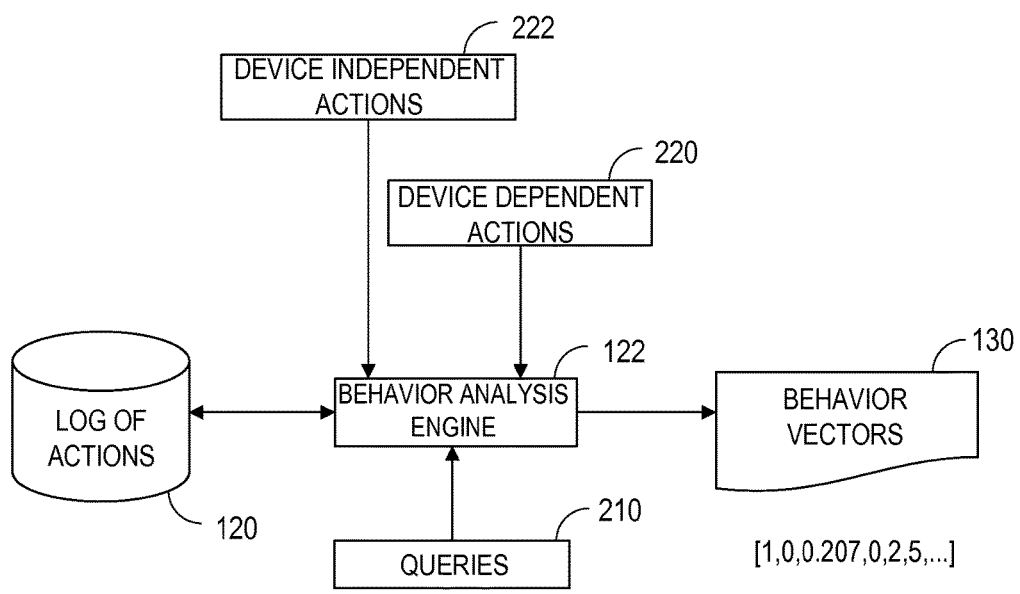
FIG. 2 is a block diagram illustrating behavior vectors that may be generated based upon a behavior analysis engine and upon a set of queries of the log.
Figure 3:
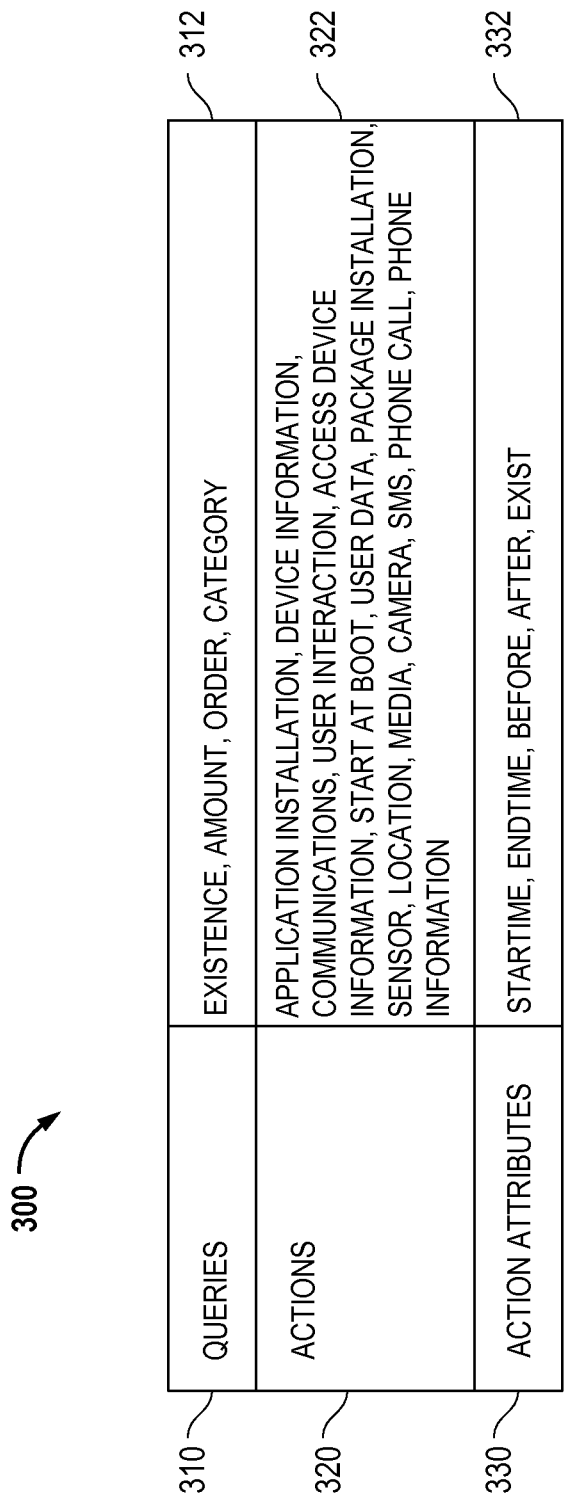
FIG. 3 is a table illustrating examples of queries, actions, and action attributes.

With additional reference to FIG. 2, behavior vectors 130 may be generated based upon a set of queries 210 of the log of actions 120. Behavior analysis engine 122 may analyze the actions recorded by log 120, based upon queries 210, to generate behavior vectors 130 that characterize the behavior of the application such that the classifier may determine and classify the behavior vectors 130 for the application as benign or malware. With reference also to FIG. 3, a chart 300 is shown that provides examples of queries 310, actions 320, and action attributes 330 that may be utilized by the behavior analysis engine 122.

For example, a set of queries 310 may include at least one or more of an existence query, an amount query, an order query, or a category query (block 312). The query 310 may be an observed behavior or an expected behavior. As a further description, behavior analysis engine 122 may analyzes device-dependent actions 220 and device-independent actions 222. As examples, as shown in FIG. 3, actions 320 may include application installation, device information, communications, and user interaction. Further actions 320 may include: access device information, start at boot, user data, package installation, sensor, location, media, camera, SMS, phone call, phone information (block 322). Also, action attributes 330 may be utilized by behavior analysis engine 122, such as: start time, end time, before, after, exist (block 332). It should be appreciated that these are just examples of queries, actions, and action attributes that may be utilized by behavior analysis engine 122 and that many other types may be utilized.

As previously described, three components may be utilized: 1) the query logger 108 that implements mechanisms to log the behavior of applications on the computing device 102 to generate a log of actions 120; 2) the behavior analysis engine 122 that analyzes the log of actions 120 and generates behavior vectors 130 that describe the behavior of the applications that are running on the computing device 102; and 3) the classifier 132 that classifies the behavior vectors 130 into either a benign or malicious category.

In this way, the behavior vectors 130 may be used in a behavioral analysis framework to detect malware on computing devices. The resulting behavior vectors 130 include the objective observations extracted from logging. As an example, the behavior analysis engine 122 answers queries 210 regarding actions (e.g., "application installation without the user's consent?", "should the application behave like a game?", "should the website act like news?", "should the application be processing SMS messages?", "should the application be processing phone calls?" etc.). The answers to these queries 210 create the behavior vectors 130.

As examples, each action may be associated with one or more of four types of queries 310: existence query, amount query, order query, and category query. For example, an existence query 310 may refer to the existence of an action set. As an example of this query, the query may be to determine whether an application has accessed device information (e.g., has phone information been accessed, has location information been accessed, etc.). The behavior analysis engine 122 may determine if the log of actions 120 includes any log of device access by the application and a behavior vector 130 may be set based on this. For example, a behavior vector 130 may be set indicating phone information has been accessed.

Further, an amount query 310 may refer to the number of occurrences of actions. As an example of this query, the query may be to determine the number of occurrence of actions by an application. As an example, this may be the number of SMS sent (e.g., outgoing communication via SMS). Thus, the behavior analysis engine 122 may determine the number of SMS sent from the log of actions 120. This query may be used to generate a behavior vector 130 indicating how many times SMS has been sent.

As another example, an order query 310 may refer to the number of occurrences of a sequence of actions. As an example of this query, the query may be to determine the number of user interactions that occurred before the application was installed (e.g., within 30 seconds before installation). Thus, the behavior analysis engine 122 may determine the number of user interactions (e.g., UI events) that occurred before the application was installed from the log of actions 120. This query may be used to generate a behavior vector 130 indicating the amount of UI events before application installation.

As another example, a category query 310 may refer to whether the application belongs to a category. As an example of this query, the query may be to determine whether the application is a location-based service. Thus, the behavior analysis engine 122 may determine whether the application is a location-based service from the log of actions 120 and whether it belongs to a category in which location information is being accessed (based on the log). As an example, this query may be used as a behavior vector 130 related to the number of times location information is being retrieved.

Further, a wide variety of different types of actions 320: application installation, device information, communications, user interaction, access device information, start at boot, user data, package installation, sensor, location, media, camera, SMS, phone call, and phone information (block 322); may be utilized by the behavior analysis engine 122 to generate behavior vectors 130. Each of these actions as recorded by the log of actions 120 may be utilized by the behavior analysis engine 122 to generate a behavior vector 130 that characterizes the behavior of the application. Moreover, a wide variety of different types of action attributes 330: start time, end time, before, after, and exist (block 332); may be utilized by the behavior analysis engine 122 to generate behavior vectors 130. Each of these action attributes, as recorded by the log of actions 120, may be utilized by the behavior analysis engine 122 to aid in generating a behavior vector 130 that characterizes the behavior of the application.

In particular, as shown in FIG. 2, behavior vectors 130 [1, 0, 0.207, 0, 2, 5, . . . ] may be generated by the behavior analysis engine 122 based upon the queries, actions, action attributes, etc., as recorded by the log of actions 120 to characterize the behavior of the application. As an example, for different types of actions, a behavior vector of around 5 may designate frequent use, a behavior vector of around 1-2 may designate rare use, and a behavior vector of around 0 may designate no use. A wide variety of different types of applications, monitored actions, and analysis of them by the behavior analysis engine 122 to generate behavior vectors 130 will be hereinafter described.

As to the generation of the behavior vectors 130 based upon the observed actions as recorded by the log of actions 102 and as analyzed by the behavior analysis engine 122, these actions to be observed or monitored may be based upon identifying types of behavior or actions that should be monitored because they represent a high probability of identifying malware. For example, system experts may identify which set of system events are related to high-level behaviors or actions that have a high probability of being malware.

Figure 4:
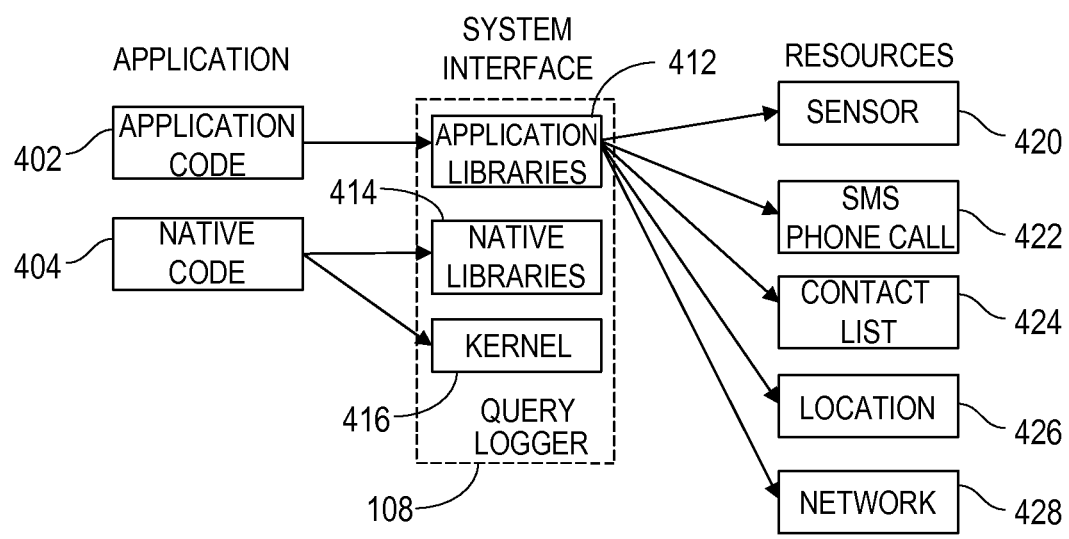
FIG. 4 is a block diagram illustrating an application operating on computing device utilizing application code and native code.

With brief reference to FIG. 4, an application may be operating on computing device 102 utilizing application code 402 and native code 404. The application code 402 may interact with application libraries 412 and the native code 404 may interact with native libraries 414 and the kernel 416 of the system interface of the computing device 102. The native code 404 may allow the application and the application code 402 to utilize the underlying functions of the native libraries 414 and the kernel 416. In particular, the underlying functions may allow the application to interact with some or all of the resources of the computing device 102, such as: sensors 420 (e.g., accelerometers, pressure sensors, etc.), SMS phone calls 422, contact list 424, location sensor 426, network interface 428, etc. Each of the libraries (application library 412 and native library 414) and the kernel 416 may be monitored by the query logger 108. In this way, query logger 108 may monitor and log the actions of the applications on the computing device to generate the log of actions 120. Further, behavior analysis engine 122 may then analyze the log of actions 120 for application from the query logger 108 to generate behavior vectors 130 for the application that characterize the behavior of the application.

As an example, for a game application, the query logger 108 may generate a log of actions of substantial usage of the application libraries 412 and native libraries 414 as to network 428 usage (e.g., network communication with a website), user interface events and sensor usage 420 (e.g., touch sensor with a user holding the computing device as they play a game), as well other actions such as substantial media action. In this way, the behavior analysis engine 122 may analyze the log of actions 120 for the application from the query logger 108 to generate behavior vectors 130 for the application that characterizes the behavior of the application, such as: frequent network usage, sensor usage, and media usage. A wide variety of different types of applications, monitored actions, and analysis of them by the behavior analysis engine 122 to generate behavior vectors 130 will be hereinafter described.

Figure 5:
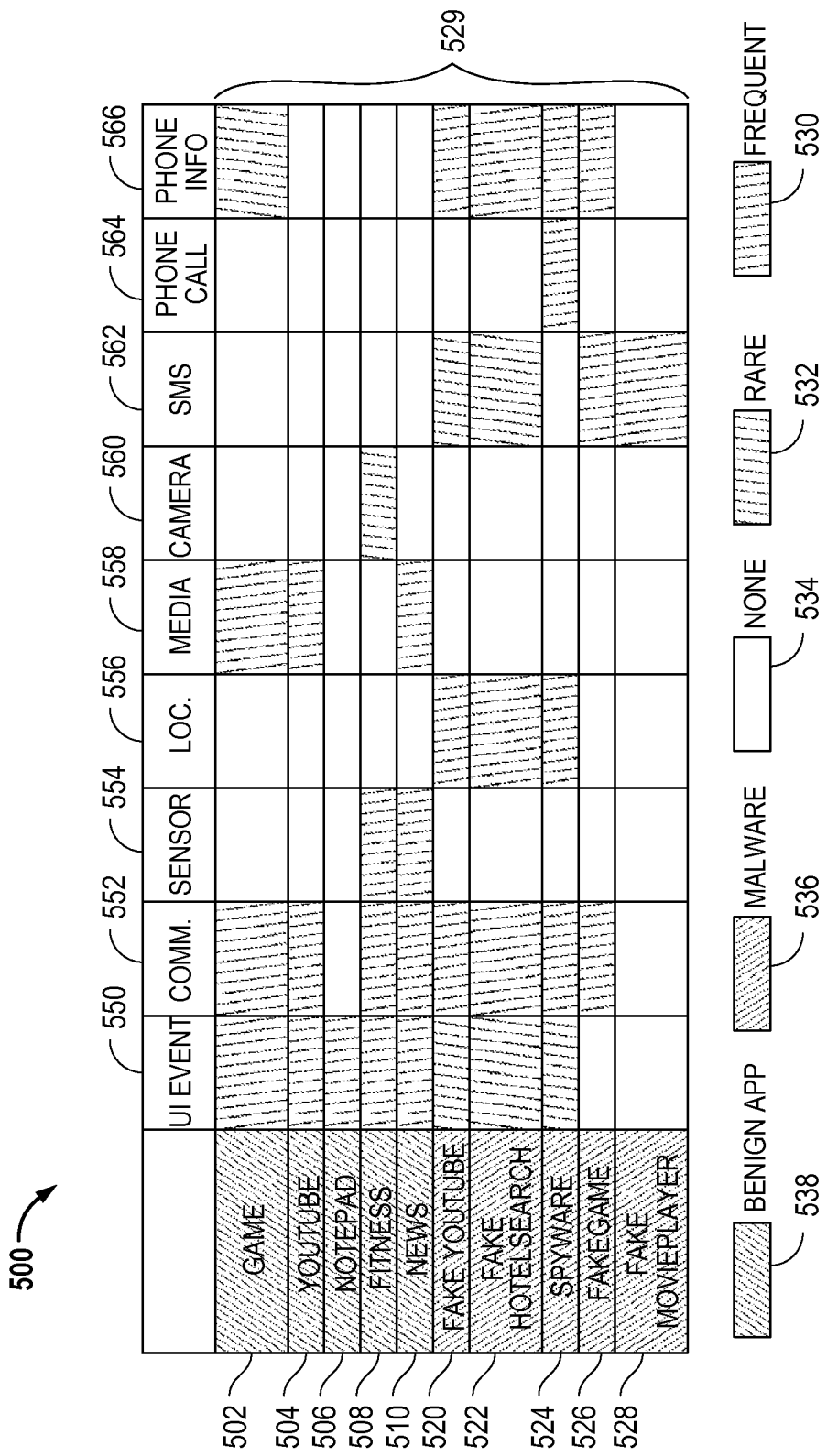
FIG. 5 is a table illustrating results of utilizing the behavior analysis engine to analyze the log from the query logger in order to generate behavior vectors that characterize the behavior of the application such that applications are identified as benign or malware.

With reference to FIG. 5, FIG. 5 is a table 500 illustrating results of utilizing the behavior analysis engine 122 to analyze the log of actions 120 from the query logger 108 in order to generate behavior vectors 130 that characterize the behavior of the application such that the classifier 132 can classify the application as benign or malware.

As shown in table 500 a plurality of applications are analyzed utilizing the behavior analysis engine. In particular the following applications are classified as benign 538 or malware 536: game 502, youtube 504, notepad 506, fitness 506, news 510, fake youtube 520, fake hotelsearch 522, spyware 524, fake game 526, and fake movieplayer 528.

For each of these applications, a behavior vector 529 is generated by the behavior analysis engine based on analyzing the log of actions from the query logger. The behavior vectors are simplified as being frequent use 530, rare use 532, and no use 534. As a numerical example, a behavior vector of around 5 may designate frequent use, a behavior vector of around 1-2 may designate rare use, and a behavior vector of around 0 may designate no use. Of course, any numerical designation may be utilized. The behavior vectors are generated based upon user interface (UI) actions 550, communication actions 552, sensor actions 554, location 556, media actions 558, camera actions 560, SMS actions 562, phone call actions 564, and phone information 566. Based upon this, the applications are designated as malware applications 536 or benign applications 538.

Various examples will now be described showing the results of utilizing a behavior analysis engine to analyze the log of actions from the query logger to generate behavior vectors that characterize the behavior of the application such that the application can be classified as benign or malware. For example, a game application 502 having behavior vectors 529 indicating: frequent 530 UI actions 550, frequent 530 communication actions 552, frequent 530 media actions 558, and no 534 or rare 532 phone, SMS, camera, location, etc., actions; is classified as benign 538. A youtube application 504 having behavior vectors 529 indicating: frequent 530 UI actions 550, frequent 530 communication actions 552, and frequent 530 media actions 558 and no 534 phone, SMS, camera, location, etc., actions; is classified as benign 538. A notepad application 506 having behavior vectors 529 indicating: frequent 530 UI actions 550 and no 534 phone, SMS, camera, location, etc., actions; is classified as benign 538. A fitness application 508 having behavior vectors 529 indicating: frequent 530 UI actions 550, frequent 530 communication actions 552, frequent 530 sensor actions 554, and no 534 or rare 532 phone, SMS, camera, location, etc., actions; is classified as benign 538. A news application 510 having behavior vectors 529 indicating: frequent 530 UI actions 550, frequent 530 communication actions 552, frequent 530 sensor actions 554, and frequent media action 558, and no 534 or rare 532 phone, SMS, camera, location, etc., actions; is classified as benign 538.

On the other hand, a fake youtube application 520 having behavior vectors 529 indicating: rare 532 UI actions 550 and rare SMS actions 562 but frequent 530 communication actions 552, frequent 530 location actions 556, and frequent 530 phone information 566; is classified as malware 536. A fake hotelsearch application 522 having behavior vectors 529 indicating: rare 532 UI actions 550 and rare SMS actions 562 but frequent 530 communication actions 552, frequent 530 location actions 556, and frequent 530 phone information 566; is classified as malware 536. A spyware application 524 having behavior vectors 529 indicating: rare 532 UI actions 550 but frequent 530 communication actions 552, frequent 530 location actions 556, frequent 530 phone calls 564, and frequent 530 phone information 566; is classified as malware 536. A fake game application 526 having behavior vectors 529 indicating: indicating: no 534 UI actions 550 but frequent 530 communication actions 552, frequent 530 SMS actions 562, and frequent 530 phone information 566; is classified as malware 536. A fake movieplayer application 528 having behavior vectors 529 indicating: no 534 UI actions 550 and media actions 558 but frequent 530 SMS actions 562; is classified as malware 536.

It has been found that by having a broad set of actions that are analyzed from the log of actions 120 from the query logger 120 by the behavior analysis engine 122 in order to generate a broad set of behavior vectors 130 that enough differentiating characteristics can be analyzed to determine whether an application should be classified as malware or benign. It has been observed that many malicious applications attempt to steal user information and/or make false charges to generate money (e.g., fake SMS charges). Furthermore, by utilizing behavior analysis for the purpose of characterizing, comparing, and classifying applications on a computing device 102 in order to determine whether applications are malware or benign utilizes limited processor and memory functionality (as opposed to signature-based malware detection) and can occur immediately without having to wait for updates from a server as to new malware or new required signatures.

Figure 6:
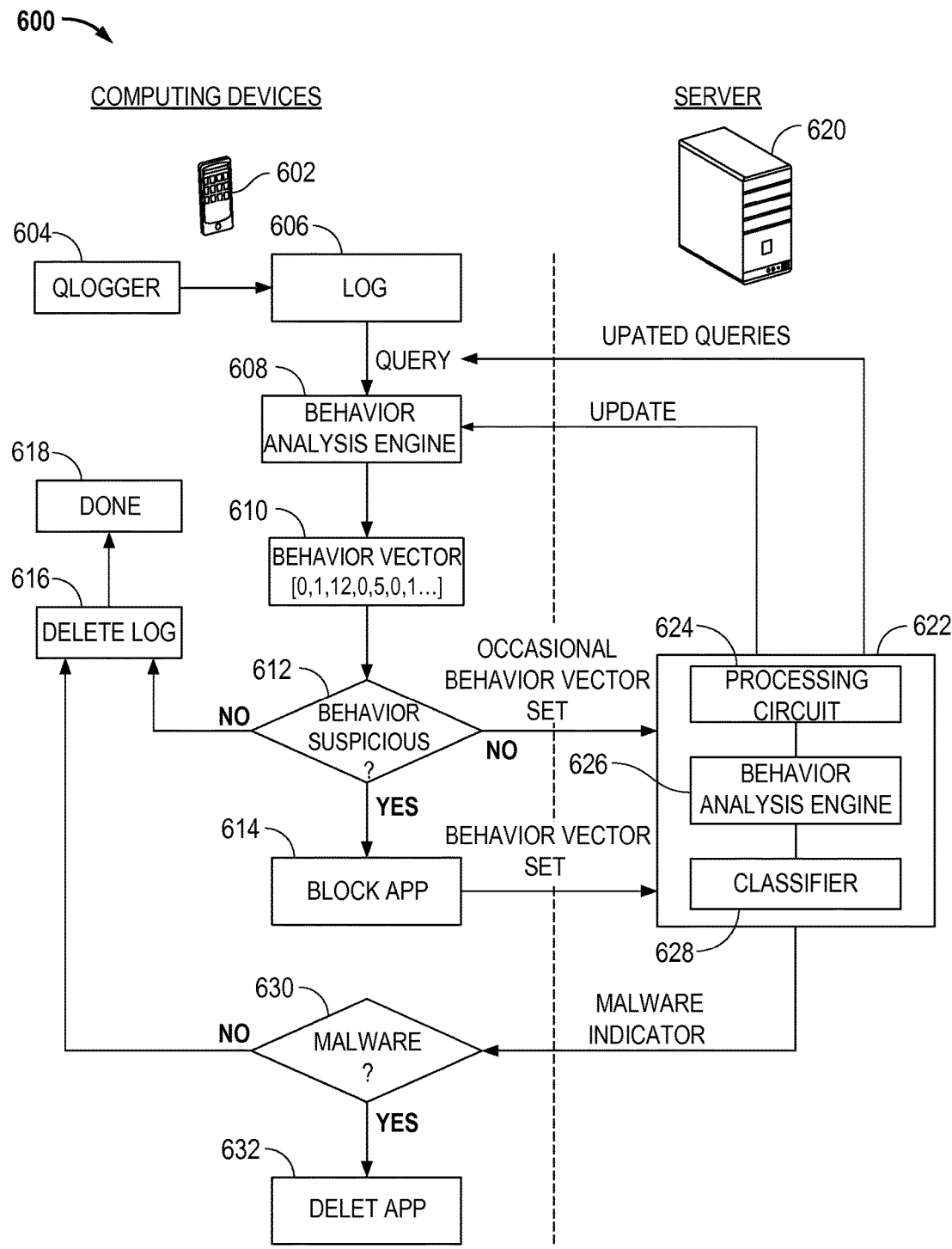
FIG. 6 is a diagram illustrating a server that may be utilized to aggregate behavior reports from a crowd of computing devices.

With additional reference to FIG. 6, according to another aspect of the invention, a system 600 including a server 620 may be utilized to aggregate behavior reports from a crowd of computing devices 602. Although only one computing device 602 is shown, the hereinafter described aspects relate to a plurality or crowd of computing devices 602. The components and functions of computing device 602 operate in the same manner as previously described with reference to computing device 102, such that these components and functions will not be repeated in detail for brevity's sake. In one aspect, a server 620 comprises components 622 including at least a processing circuit 624, a behavior analysis engine 626, and a global classifier 628. Processing circuit 624 may include a transmitter and a receiver. The use of behavior analysis engines, query loggers, behavior vectors, classifiers, etc., as well as other components and functions, have been previously described in detail. Processing circuit 624 may be configured to execute instructions for implementing and operating with the receiver, the transmitter, the behavior analysis engine 626, the global classifier 628, as well as other components, based upon instructions stored in memory coupled to the processing circuit 624 or other components. It should be appreciated by those of skill in the art that server's utilizing processors and memory are well known in the art.

In one aspect, a receiver of processing circuit 624 of server 620 may receive a plurality of behavior vector sets 610 from a plurality of different computing devices 602 (e.g., when a computing device 602 through its behavior analysis engine 608 determines that an application's behavior may be suspicious or occasional behavior vector set updates (see decision block 612)). As previously described, a behavior vector set 610 characterizes the behavior of an application. The behavior analysis engine 626 of the server 620 may update the global classifier 628 based upon received behavior vector sets 610 from computing devices 602. Further, as will be described, the global classifier 628 may classify a received behavior vector set for an application from a computing device 602 that has identified an application as having suspicious behavior (e.g., block 612) as benign or malware.

In one particular aspect, a computing device 602 may determine that an application's behavior is suspicious and may transmit the behavior vector set 610 for the application to the server 620 to have the server 620 analyze the behavior vector set 610. The global classifier 628 of server 620 may classify the transmitted behavior vector set 610 as benign or malware. If the behavior vector set 610 for an application is classified as malware, a malware indicator may be transmitted to the plurality of computing devices 602 and the computing devices 602 may delete 632 the application.

Further, server 620 via a transmitter of processing circuit 624 may transmit an update to the plurality of computing devices 602, wherein the update is used to update the behavior analysis engines 608 of the plurality of computing devices 602. In this way, based upon all of the behavior vectors sets and other data received from the crowd of computing devices 602, server 620 can periodically update the behavior analysis performed by the computing devices themselves.

Thus, server 620 operates as crowd sourcing server by aggregating behavior reports from a crowd of computing devices 602. By collecting a large input set over time, more accurate and updated behavior models are generated in an expedited manner and can be passed on to all the operating computing devices 602. Also, when an application is determined to be malware, all of the computing devices 602 can be notified of this.

As an example of operation, as shown in FIG. 6, a query logger 604 of a computing device 602 may log the behavior of an application to generate of a log of actions 606. Next, the behavior analysis engine 608 of the computing device 602 may analyze the log of actions 608 to generate a behavior vector set 610 that characterizes the behavior of the application. As an example, the behavior vector set 610 may include at least one numerical value. At decision block 612, if the classifier of the computing device 602 does not find that the behavior vector set indicates anything suspicious about the application (e.g., it has a low likelihood of being malware), then the log is deleted (block 616) and the process is done (block 618). Many of these functions have been previously described in detail.

However, if the behavior is determined to be suspicious (decision block 612) by the computing device 602, then computing device 602 may block the use of the application (block 614) and may transmit the behavior vector set 610 to server 620. Server 620 may receive the behavior vector set 610 via processing circuit 624 and may check the behavior vector set 610 to determine if the application is benign or malware. Also, the behavior vector set 610 transmitted from the computing device 602 to server 620 may also include an indicator that the application has been blocked. Additionally, computing device 602 may transmit the log as well as other data to the server 620. It should be noted that this step may happen in real-time (i.e. at the time when the behavior is classified) or it may happen at a later time (e.g. when the device has better access to bandwidth or power).

Based upon the received behavior vector set 610, the global classifier 628 of server 620 may classify the application as benign or malware. If the behavior vector set 610 for the application is classified as malware, a malware indicator may be transmitted to the plurality of computing devices 602. Based upon this, if a computing device 602 receives a malware indication (decision block 630), then the computing device 602 may delete the application (block 632). However, if it is not malware, the log may be deleted (block 616) and the process is completed or done (block 618) such that the computing device 602 maintains normal operations including utilizing the application.

In another aspect, when computing devices 602 determine that an application's behavior is not suspicious (block 612), computing devices 602 occasionally transmit their behavior vector sets 610 (as well as logs, queries, and other information) related to applications to the server 620 such that the behavior analysis engine 626 and global classifier 628 of the server 620 receive a wide range of information about applications being utilized by computing devices 602. In this way, all of the computing devices 602 collaborate to keep server 620 updated in its behavior modeling.

Similarly, server 620 via processing circuit 624 occasionally transmits updates to the plurality of computing devices 602 in which the updates may be used by computing devices 602 to update their behavior analysis engines 608 and classifiers and generally update their behavior modeling and analysis of applications. Also, server 620 via processing circuit 624 may occasionally transmit updated queries to the plurality of computing devices 602 that the computing devices may utilize to query their log of actions 606, update their query loggers 604, and that may be utilized in conjunction with their behavior analysis engines 608 and classifiers to update behavior modeling and analysis of applications. In this way, based upon behavior updates, behavior vector sets, queries, as well as other data received from the server 620, server 620 can periodically update the behavior analysis performed by the computing devices 602 themselves.

Thus, server 620 operates as crowd sourcing server by aggregating behavior reports from a crowd of computing devices 602. In essence, server 620 may evaluate the behavior of an application against a model of benign and malicious behavior obtained from collaborative uploading from a crowd of computing devices 602. By collecting a large input set over time, more accurate and updated behavior models are generated in an expedited manner and can be passed on to all operating computing devices 602. Biases by individual computing devices may be accounted for. Moreover, individual computing devices 602 can take advantage of behavior models generated based upon a crowd of reports from other computing devices. Also, when an application is determined to be malware, all of the computing devices 602 can be notified of this. Further, the monitoring and computational overhead on individual computing devices 602 for the purpose of malware detection can be reduced by utilizing a crowd-based server 620. In particular, by utilizing collaborative analysis, a large amount of behavior vectors and logs may be accumulated by server 620 from a crowd of computing devices 602 for timely malware detection. Thus, the resulting behavior model may be both accurate (low false positive and false negative) and general (may capture a wide variety of different types of malware). It should be noted that the behavior models for the behavior analysis engine 608 at each computing device 602 are unique. Further, the overall characteristics received from the server 620 are uniquely modified for the computing device 602.

As one example, three different steps may be utilized in collaborating a crowd of computing devices 602 with a server 620: initialization; collaborative behavior modeling and malware detection; and behavior model updating. As to initialization, a behavior analysis engine and classifier (e.g., for a computing device 602) may be trained by a set of known-bad applications, or malware, and a set of known-good applications. The training process may be accomplished using standard supervised machine learning techniques. Before a computing device 602 is provided to a user, the computing device 602 may be required to obtain an up-to-date behavior model for its behavior analysis engine 608 from the server 620. Additionally, server 620 may provide a computing device 602 with a list of APIs that should be logged and instructions regarding how to generate a behavior vector (e.g., a succinct representation of an application's behavior) from the API log utilizing the behavior analysis engine.

As to collaborative behavior monitoring and malware detection, as previously described, when a user is utilizing their computing device 602, the computing device 602 periodically monitors and computes a behavior vector 610 utilizing behavior analysis engine 608 for each running application and by utilizing a classifier may determine whether this application behaves similar to malware or benign applications. Applications that are classified to be malicious by the computing device 602, can be confirmed by the server 620, and should be removed from the computing device 602 (e.g., block 632) or denied from installation. Applications classified as benign can run with full permissions. For applications that are determined to be suspicious (decision block 612), e.g., detected suspicion locally by the computing device 602 itself—but that requires further investigation—in these cases, the computing device 602 can put the application into a constrained environment and may be allowed only limited access. This application may then be reported to the server 620 for further investigation, as previously described.

As to behavior model updates, to enable collaboration, computing devices 602 periodically upload their behavior vectors 610 and other data to the server 620, as previously described. The server 620 can additionally request the original logs from the computing devices 602 as well. The server 620, which may be a resource-abundant machine (or cluster), can perform in-depth analysis and then update the behavior model via the behavior analysis engine 626 and global classifier 628. If the model changes significantly after update, the server 620 may push the updated behavior model to the behavior analysis engine 608 and classifier of the computing devices 602. Changes may be infrequent as more data is collected and the model becomes stable.

Thus, the previously-described system may act as an additional layer of protection, complementary to static analysis and signature-based antivirus approaches. As to one particular benefit, malware may be detected that has not been added to the antivirus's database or malware that pretends to be benign at the installation time. In particular, server 620 operates as crowd sourcing server by aggregating behavior reports from a crowd of computing devices 602. In essence, server 620 may evaluate the behavior of an application against a model of benign and malicious behavior obtained from collaborative uploading from a crowd of computing devices 602. By collecting a large input set over time, more accurate and updated behavior models are generated in an expedited manner and can be passed on to all operating computing devices 602.

It should be appreciated that when the computing device or server is a mobile or wireless device that it may communicate via one or more wireless communication links through a wireless network that are based on or otherwise support any suitable wireless communication technology. For example, in some aspects computing device or server may associate with a network including a wireless network. In some aspects the network may comprise a body area network or a personal area network (e.g., an ultra-wideband network). In some aspects the network may comprise a local area network or a wide area network. A wireless device may support or otherwise use one or more of a variety of wireless communication technologies, protocols, or standards such as, for example, CDMA, TDMA, OFDM, OFDMA, WiMAX, and Wi-Fi. Similarly, a wireless device may support or otherwise use one or more of a variety of corresponding modulation or multiplexing schemes. A wireless device may thus include appropriate components (e.g., air interfaces) to establish and communicate via one or more wireless communication links using the above or other wireless communication technologies. For example, a device may comprise a wireless transceiver with associated transmitter and receiver components (e.g., a transmitter and a receiver) that may include various components (e.g., signal generators and signal processors) that facilitate communication over a wireless medium. As is well known, a mobile wireless device may therefore wirelessly communicate with other mobile devices, cell phones, other wired and wireless computers, Internet web-sites, etc.

The techniques described herein can be used for various wireless communication systems such as Code Division Multiple Access (CDMA), Time division multiple access (TDMA), Frequency Division Multiple Access (FDMA), Orthogonal Frequency-Division Multiple Access (OFDMA), Single Carrier FDMA (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers Interim Standard (IS)-2000, IS-95 and IS-856 standards. A TDMA system can implement a radio technology such as Global System for Mobile Communications (GSM). An OFDMA system can implement a radio technology such as Evolved Universal Terrestrial Radio Access; (Evolved UTRA or E-UTRA), Ultra Mobile Broadband (UMB), Institute of Electrical and Electronics Engineers (IEEE) 802.11 (Wi-Fi), IEEE 802.16 (WiMAX), IEEE 802.20, Flash-OFDM.R™, etc. Universal Terrestrial Radio Access (UTRA) and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). CDMA2000 and UMB are described in documents from an organization named "3rd Generation Partnership Project 2" (3GPP2).

The teachings herein may be incorporated into (e.g., implemented within or performed by) a variety of apparatuses (e.g., devices). For example, one or more aspects taught herein may be incorporated into a phone (e.g., a cellular phone), a personal data assistant ("PDA"), a tablet, a mobile computer, a laptop computer, a tablet, an entertainment device (e.g., a music or video device), a headset (e.g., headphones, an earpiece, etc.), a medical device (e.g., a biometric sensor, a heart rate monitor, a pedometer, an EKG device, etc.), a user I/O device, a computer, a server, a point-of-sale device, an entertainment device, a set-top box, or any other suitable device. These devices may have different power and data requirements In some aspects a wireless device may comprise an access device (e.g., a Wi-Fi access point) for a communication system. Such an access device may provide, for example, connectivity to another network (e.g., a wide area network such as the Internet or a cellular network) via a wired or wireless communication link. Accordingly, the access device may enable another device (e.g., a Wi-Fi station) to access the other network or some other functionality. In addition, it should be appreciated that one or both of the devices may be portable or, in some cases, relatively non-portable.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A mobile computing device comprising:
   a processor configured with processor-executable instructions to:
   monitor a plurality of applications operating on the mobile computing device;
   log actions of the monitored applications in a log of actions;
   generate answers to queries regarding the actions stored in the log of actions, the answers including an answer to a category query;
   generate a vector information structure for each application in the plurality of applications based on the generated answers, wherein:
   each generated vector information structure includes a plurality of numerical values;
   at least one numerical value in the plurality of numerical values identifies a number of occurrences of an action by an application;
   at least one numerical value in the plurality of numerical values indicates a category for the application based on the answer to the category query; and
   the plurality of numerical values in each generated vector information structure collectively characterize a behavior of one application in the plurality of applications; and
   use a machine learning classifier to determine whether the behavior characterized by each vector information structure is benign based on the plurality of numerical values.

2. The mobile computing device of claim 1, wherein the processor is further configured with processor-executable instructions to:
   restrict an application from usage in response to determining that the behavior characterized by the vector information structure associated with the application is not benign.

3. The mobile computing device of claim 1, wherein the processor is configured with processor-executable instructions to perform operations such that generating answers to queries regarding the actions stored in the log of actions includes:
   generating at least one answer to an existence query, an amount query, or an order query.

4. The mobile computing device of claim 3, wherein the processor is configured with processor-executable instructions to perform operations such that generating answers to queries regarding the actions stored in the log of actions further comprises:
   generating at least one answer to:
   a query regarding an observed behavior; and
   a query regarding an expected behavior.

5. The mobile computing device of claim 1, wherein the processor is further configured with processor-executable instructions to analyze device-independent actions.

6. The mobile computing device of claim 1, wherein the processor is further configured with processor-executable instructions to analyze device-dependent actions.

7. The mobile computing device of claim 6, wherein the processor is configured with processor-executable instructions to perform operations such that analyzing the device-dependent actions comprises analyzing a combination of:
application installation information;
device information;
communications information; and
user interaction information.

8. A method of analyzing a plurality of applications operating on a mobile computing device, the method comprising:
monitoring the plurality of applications operating on the mobile computing device via a processor of the mobile computing device;
logging actions of the monitored applications in a log of actions via the processor of the mobile computing device;
generating answers to queries regarding the actions stored in the log of actions, the answers including an answer to a category query;
generating, by the processor, a vector information structure for each application in the plurality of applications based on the generated answers, wherein:
each generated vector information structure includes a plurality of numerical values;
at least one numerical value in the plurality of numerical values identifies a number of occurrences of an action by an application;
at least one numerical value in the plurality of numerical values indicates a category for the application based on the answer to the category query; and
the plurality of numerical values in each generated vector information structure collectively characterize a behavior of one application in the plurality of applications; and
using by the processor a machine learning classifier to determine whether the behavior characterized by each vector information structure is benign based on the plurality of numerical values.

9. The method of claim 8, further comprising restricting an application from usage in response to determining that the behavior characterized by the vector information structure associated with the application is not benign.

10. The method of claim 8, wherein generating answers to queries regarding the actions stored in the log of actions includes:
generating at least one answer to an existence query, an amount query, or an order query.

11. The method of claim 10, wherein generating answers to queries regarding the actions stored in the log of actions further comprises:
generating at least one answer to:
a query regarding an observed behavior; and
a query regarding an expected behavior.

12. The method of claim 8, further comprising analyzing device-independent actions.

13. The method of claim 8, further comprising analyzing device-dependent actions.

14. The method of claim 13, wherein analyzing the device-dependent actions further comprises analyzing a combination of:
application installation information;
device information;
communications information; and
user interaction information.

15. A non-transitory computer-readable storage medium having stored thereon processor-executable software instructions configured to cause a processor of a mobile computing device to perform operations comprising:
monitoring a plurality of applications operating on the mobile computing device;
logging actions of the monitored applications in a log of actions;
generating answers to queries regarding the actions stored in the log of actions, the answers including an answer to a category query;
generating a vector information structure for each application in the plurality of applications based on the generated answers, wherein:
each generated vector information structure includes a plurality of numerical values;
at least one numerical value in the plurality of numerical values identifies a number of occurrences of an action by an application;
at least one numerical value in the plurality of numerical values indicates a category for the application based on the answer to the category query; and
the plurality of numerical values in each generated vector information structure collectively characterize a behavior of one application in the plurality of applications; and
using a machine learning classifier to determine whether the behavior characterized by each vector information structure is benign based on the plurality of numerical values.

16. The non-transitory computer-readable storage medium of claim 15, wherein the stored processor-executable software instructions are configured to cause a processor of the mobile computing device to perform operations further comprising:
restricting an application from usage in response to determining that the behavior characterized by the vector information structure associated with the application is not benign.

17. The non-transitory computer-readable storage medium of claim 15, wherein the stored processor-executable software instructions are configured to cause a processor of the mobile computing device to perform operations such that includes:
generating at least one answer to an existence query, an amount query, or an order query.

18. The non-transitory computer-readable storage medium of claim 17, wherein the stored processor-executable software instructions are configured to cause a processor of the mobile computing device to perform operations such that generating answers to queries regarding the actions stored in the log of actions further comprises:
generating at least one answer to:
a query regarding an observed behavior; and
a query regarding an expected behavior.

19. The non-transitory computer-readable storage medium of claim 15, wherein the stored processor-executable software instructions are configured to cause a processor of the mobile computing device to perform operations further comprising analyzing device-independent actions.

20. The non-transitory computer-readable storage medium of claim 15, wherein the stored processor-executable software instructions are configured to cause a processor of the mobile computing device to perform operations further comprising analyzing device-dependent actions.

21. The non-transitory computer-readable storage medium of claim 20, wherein the stored processor-executable software instructions are configured to cause a processor of the mobile computing device to perform operations such that analyzing the device-dependent actions further comprises analyzing a combination of:
application installation information;
device information;
communications information; and
user interaction information.

22. A mobile computing device comprising:
means for monitoring a plurality of applications operating on the mobile computing device;
means for logging actions of the monitored applications in a log of actions;
means for generating answers to queries regarding the actions stored in the log of actions, the answers including an answer to a category query;
means for generating a vector information structure for each application in the plurality of applications based on the generated answers, wherein:
each generated vector information structure includes a plurality of numerical values;
at least one numerical value in the plurality of numerical values identifies a number of occurrences of an action by an application;
at least one numerical value in the plurality of numerical values indicates a category for the application based on the answer to the category query; and
the plurality of numerical values in each generated vector information structure collectively characterize a behavior of one application in the plurality of applications;
means for using a machine learning classifier to determine whether the behavior characterized by each vector information structure is benign based on the plurality of numerical values.

23. The mobile computing device of claim 22, further comprising:
means for restricting an application from usage in response to determining that the behavior characterized by the vector information structure associated with the application is not benign.

24. The mobile computing device of claim 22, wherein means for generating answers to queries regarding the actions stored in the log of actions includes:
means for generating at least one answer to an existence query, an amount query, or an order query.

25. The mobile computing device of claim 24, wherein means for generating answers to queries regarding the actions stored in the log of actions further comprises:
means for generating at least one answer to:
a query regarding an observed behavior; and
a query regarding an expected behavior.

26. The mobile computing device of claim 22, further comprising means for analyzing device-independent actions.

27. The mobile computing device of claim 22, wherein further comprising means for analyzing device-dependent actions.

28. The mobile computing device of claim 27, wherein means for analyzing the device-dependent actions comprises means for analyzing a combination of:
application installation information
device information;
communications information; and
user interaction information.

\* \* \* \* \*